(12) United States Patent
Davison et al.

(10) Patent No.: US 8,503,785 B2
(45) Date of Patent: Aug. 6, 2013

(54) DYNAMIC RESPONSE BUBBLE ATTRIBUTE COMPENSATION

(75) Inventors: Owen C. Davison, Honey Brook, PA (US); Victor F. Berutti, Glenmoore, PA (US); Bruce D. Holenstein, Media, PA (US); Tristan E. Hoffmann, Exton, PA (US)

(73) Assignee: Gravic, Inc., Malvern, PA (US)

( * ) Notice: Subject to any disclaimer, the term of this patent is extended or adjusted under 35 U.S.C. 154(b) by 808 days.

(21) Appl. No.: 12/688,210

(22) Filed: Jan. 15, 2010

(65) Prior Publication Data
US 2011/0176736 A1 Jul. 21, 2011

(51) Int. Cl.
*G06K 9/00* (2006.01)

(52) U.S. Cl.
USPC ............ 382/181; 382/128; 382/133; 382/276

(58) Field of Classification Search
USPC .................. 382/113, 192, 226, 317; 235/375, 235/386
See application file for complete search history.

(56) References Cited

U.S. PATENT DOCUMENTS

| | | | |
|---|---|---|---|
| 3,858,180 A | | 12/1974 | Spanjersberg |
| 3,971,887 A | * | 7/1976 | Lin et al. ........................ 348/795 |
| 4,937,439 A | | 6/1990 | Wanninger et al. |
| 4,989,258 A | | 1/1991 | Takahashi et al. |
| 5,102,341 A | | 4/1992 | Koslin |
| 5,134,669 A | | 7/1992 | Keogh et al. |
| 5,184,003 A | | 2/1993 | McMillin et al. |
| 5,224,180 A | * | 6/1993 | Tadokoro ........................ 382/181 |
| 5,235,655 A | | 8/1993 | Hikawa |
| 5,452,379 A | | 9/1995 | Poor |
| 5,711,673 A | | 1/1998 | Grundy, Jr. |
| 5,848,198 A | * | 12/1998 | Penn .............................. 382/276 |
| 6,137,899 A | * | 10/2000 | Lee et al. ....................... 382/133 |
| 6,519,571 B1 | * | 2/2003 | Guheen et al. ............. 705/14.66 |
| 6,854,644 B1 | | 2/2005 | Bolton et al. |
| 7,077,313 B2 | | 7/2006 | Chung et al. |
| 7,555,145 B2 | | 6/2009 | Holenstein et al. |
| 7,953,261 B2 | * | 5/2011 | Nishimura et al. ............ 382/128 |
| 2001/0033688 A1 | * | 10/2001 | Taylor .............................. 382/181 |
| 2007/0292011 A1 | * | 12/2007 | Nishimura et al. ............ 382/128 |

FOREIGN PATENT DOCUMENTS

| | | |
|---|---|---|
| JP | 04255088 | 10/1992 |
| JP | 07013984 A | 1/1995 |
| WO | 03010704 A1 | 2/2003 |

* cited by examiner

*Primary Examiner* — Vu Le
*Assistant Examiner* — Aklilu Woldemariam
(74) *Attorney, Agent, or Firm* — Panitch Schwarze Belisario & Nadel LLP

(57) ABSTRACT

Image data of a response form is processed. The response form has a plurality of response bubbles, including at least one filled and at least one unfilled response bubble. One or more baseline response bubble attributes for unfilled response bubbles are provided in a memory. Image data of a response form is processed to determine one or more response bubbles that are unfilled. One or more actual response bubble attributes of the one or more unfilled response bubbles is then calculated. A difference metric value is then calculated by comparing the one or more baseline response bubble attributes to the one or more actual response bubble attributes. The one or more baseline response bubble attributes are reset to a new set of one or more baseline response bubble attributes if the difference metric value exceeds a predetermined threshold. The one or more baseline response bubble attributes are maintained at their present value if the difference metric value does not exceed the predetermined threshold. The image data of the response form is then processed using either the reset or maintained one or more baseline response bubble attributes to determine the filled and unfilled response bubbles of the response form.

27 Claims, 9 Drawing Sheets

Figure 1

Response Bubble Attribute Differences
Caused By Scanner Brightness Settings Example

| Image clips of Question 4 from the same filled response form scanned multiple times at different brightness settings | Scanner Brightness Setting (1000 to -1000, white to black) | Response Bubble Attribute (e.g., Average Density for Unfilled Response Bubbles) | Difference Metric (e.g., Percent Difference from Baseline) |
|---|---|---|---|
| 4 Ⓐ Ⓑ Ⓒ Ⓓ Ⓔ | 500 | 19.39 | -28.18 |
| 4 Ⓐ Ⓑ Ⓒ Ⓓ Ⓔ | 450 | 20.21 | -25.14 |
| 4 Ⓐ Ⓑ Ⓒ Ⓓ Ⓔ | 400 | 21.11 | -21.81 |
| 4 Ⓐ Ⓑ Ⓒ Ⓓ Ⓔ | 300 | 22.37 | -17.14 |
| 4 Ⓐ Ⓑ Ⓒ Ⓓ Ⓔ | 200 | 24.12 | -10.66 |
| 4 Ⓐ Ⓑ Ⓒ Ⓓ Ⓔ | 100 | 25.43 | -5.81 |
| 4 Ⓐ Ⓑ Ⓒ Ⓓ Ⓔ | 0 (Baseline) | 27.00 | 0 |
| 4 Ⓐ Ⓑ Ⓒ Ⓓ Ⓔ | -100 | 28.41 | 5.22 |
| 4 Ⓐ Ⓑ Ⓒ Ⓓ Ⓔ | -200 | 30.42 | 12.66 |
| 4 Ⓐ Ⓑ Ⓒ Ⓓ Ⓔ | -300 | 32.14 | 19.03 |
| 4 Ⓐ Ⓑ Ⓒ Ⓓ Ⓔ | -400 | 34.60 | 28.14 |
| 4 Ⓐ Ⓑ Ⓒ Ⓓ Ⓔ | -500 | 38.00 | 40.74 |
| 4 Ⓐ Ⓑ Ⓒ Ⓓ Ⓔ | -550 | 39.8 | 47.40 |

Figure 3a

Baseline settings from Form Template Information

| Baseline unfilled response form image used to create the Form Template | Calculated Baseline Density for Unfilled Marks | Fill Threshold Metric | Difference Metric Threshold Value |
|---|---|---|---|
| 4  Ⓐ Ⓑ Ⓒ Ⓓ Ⓔ | 27.00 | Baseline average density + 10.00 | 5.00 |

Figure 3b (PRIOR ART)

Image scanned with high brightness scanner setting without dynamic response bubble attribute compensation when considering filled response bubble "D"

| Image clip of Question 4 from filled response form scanned with high brightness:<br>4  Ⓐ Ⓑ Ⓒ Ⓓ Ⓔ | |
|---|---|
| Baseline Average Density | 27.00 |
| Fill Metric Value (Actual Density for Response Bubble "D") | 33.67 |
| Fill Threshold | 37.00 |
| Fill Status | Unfilled (Incorrect) |

Figure 3c

Image scanned with high brightness scanner setting with dynamic response bubble attribute compensation when considering filled response bubble "D"

| Image clip of Question 4 from filled response form scanned with high brightness:<br>4  Ⓐ Ⓑ Ⓒ Ⓓ Ⓔ | |
|---|---|
| Baseline Average Density | 27.00 |
| Actual Average Density of Unfilled Response Bubbles | 21.11 |
| Difference Metric Value | 5.89 |
| Reset Baseline Average Density | 21.11 |
| Fill Threshold | 31.11 |
| Fill Metric Value (Actual Density for Response Bubble "D") | 33.67 |
| Fill Status | Filled (Correct) |

Figure 3d (PRIOR ART)

Image scanned with low brightness scanner setting without using dynamic response bubble attribute compensation when considering unfilled response bubble "B"

| Image clip of Question 4 from filled response form scanned with low brightness: 4  Ⓐ  Ⓑ  Ⓒ  Ⓓ  Ⓔ | |
|---|---|
| Baseline Average Density | 27.00 |
| Fill Metric Value (Actual Density for Response Bubble "B") | 38.00 |
| Fill Threshold | 37.00 |
| Fill Status | Filled (Incorrect) |

Figure 3e

Image scanned with low brightness scanner setting using dynamic response bubble attribute compensation when considering unfilled response bubble "B"

| Image clip of Question 4 from filled response form scanned with low brightness: 4  Ⓐ  Ⓑ  Ⓒ  Ⓓ  Ⓔ | |
|---|---|
| Baseline Average Density | 27.00 |
| Actual Average Density of Unfilled Response Bubbles | 37.00 |
| Difference Metric Value | 10.00 |
| Reset Baseline Average Density | 37.11 |
| Fill Threshold | 47.00 |
| Fill Metric Value (Actual Density for Response Bubble "B") | 38.00 |
| Fill Status | Unfilled (Correct) |

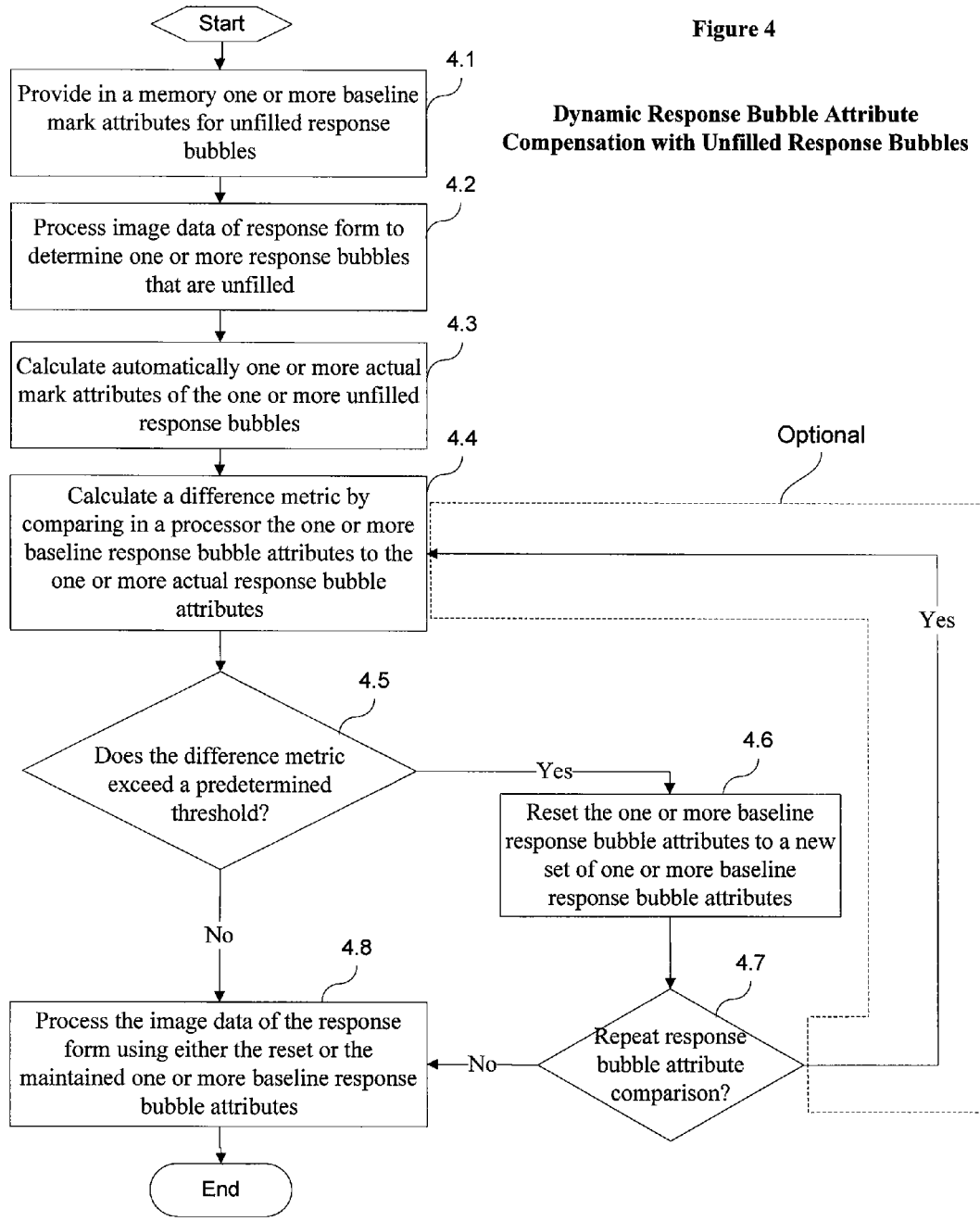

Dynamic Response Bubble Attribute Compensation with Well-Filled Response Bubbles Dynamic Response Bubble Attribute Compensation Based Upon Expected Results Hardware Diagram

DYNAMIC RESPONSE BUBBLE ATTRIBUTE COMPENSATION

BACKGROUND OF THE INVENTION

Today, plain-paper Optical Mark Recognition (OMR) technology uses pattern recognition to automatically find response bubbles and to determine whether or not the response bubbles are filled. There are two types of commercially available plain-paper technologies in use today. One technology prints registration marks on the forms. The other technology does not require the use of any preprinted registration marks but instead depends upon the location of the response bubbles for registration. Using pattern-recognition technology, both technologies automatically register the form, find response bubbles, and determine whether or not the response bubbles are filled. These technologies allow mark-sense forms to be designed using standard, commercially available word processing or graphics packages and to be printed by any quality printer on most papers. Any pencil or pen may be used to mark the forms, and the forms can be read using any device that can capture and produce an image, such as an image scanner or digital camera.

In order to recognize OMR forms with current plain-paper technology, such as Remark Office OMR®, available from Gravic, Inc., Malvern, Pa., response bubble attributes, such as the location, size, density and number of contiguous pels comprising the outline of the response bubbles, are known beforehand. This is typically accomplished by creating a template for a response form using a baseline image of an unfilled response form which defines the locations of the response bubbles, the size of the response bubbles within each region, the average fill value or density and other attributes of the response bubbles within each region. This information defines the characteristics of the response bubbles. When processing completed forms, the located response bubbles on the completed forms are compared to their corresponding response bubble definitions in the form template to determine whether or not the response bubbles are filled. This comparison will typically involve a number of factors including the size of the response bubble, the location of the response bubble, and the density of the response bubble. A response bubble fill metric incorporating these factors is then calculated and used to determine if the response bubble is filled. If the response bubble fill metric value of the response bubble being recognized is higher than the predetermined fill threshold, then the response bubble being recognized is considered to be filled.

However, this approach for determining whether or not a response bubble is filled relies heavily on making sure that the baseline attributes of response bubbles, as well as other form elements, such as barcodes, graphic files and text, are consistent across the form template and the scanned in form. Variances in the response bubble and element attributes between the form image used to define the form template and the image of the filled-in response form being processed could cause inaccurate results. Such variances most often occur when there are inconsistencies when printing or scanning response forms, potentially causing the size of the form, the skew of the form or the brightness of the form to be different from the original. If the response bubble attributes of the response bubbles from the original form used to create the template differ significantly from the response bubble attributes of the response bubbles from the forms being recognized, then the comparison between an unfilled response bubble and the response bubbles being recognized is no longer valid and can produce erroneous results.

Differences in form element attributes can be introduced in many different ways. Some possible ways to introduce differences in form element attributes include: using different printers, using different scanners, photocopying the forms, faxing forms, low toner levels, different scanner settings, different software settings and different paper (color, weight, material, or brand).

For example, if a form image being processed is significantly lighter than the form image used to create the template either because of different printers being used or being scanned at different brightness settings, then the response bubbles will have a much lower density attribute when compared to the baseline density attribute from the form template. FIG. 1 illustrates this situation by showing calculated response bubble attribute values, in this case the average density for unfilled response bubbles, and the resulting difference metric value calculated when taking the percent difference from the average density of unfilled response bubbles and the average density of unfilled response bubbles from the baseline image. To calculate these values, the same response form was scanned using a variety of scanner brightness settings, with the image scanned using a 0 brightness setting considered to be the baseline image. Consequently, partially filled response bubbles may not be reported as being filled since their calculated density causes the response bubble fill metric value to fall below the fill threshold. If a form image being processed is significantly darker than the form image used to create the form template, then unfilled response bubbles or very lightly filled response bubbles may be reported as being filled since their calculated density may cause the response bubble fill metric value to exceed the fill threshold. Likewise, if a form image being recognized is condensed or stretched as compared to the original or has other spatial abnormalities, then those corresponding response bubble attributes may be different than the determined baseline response bubble attributes, causing the response bubble fill metric to use potentially invalid comparisons of the attributes of the response bubble. In each case, the problem lies with the rigidity of the precalculated response bubble attributes.

One of the ways currently available to address differences in response bubble attributes and other issues, as illustrated in FIG. 2, is to modify the image or the process used to produce the image in order to create an image that provides better results when recognized. First, the image is scanned, and the scanning software creates a black-and-white image of the filled response form. Then the recognition software determines the form element attributes of the response bubbles, and uses this information to process the data of the response form image. If after reviewing the data, the user determines that the recognition quality is inadequate, the process can be repeated by either adjusting the scanning settings and re-scanning the image or adjusting the image thresholds and producing another black-and-white image from the original scan. Some of the image and threshold settings that can be adjusted include both brightness and contrast.

This can be an iterative process. Each new iteration may produce a different image. The process ends once adequate recognition results were achieved. Optical Mark Recognition is typically performed on black and white images. In order to produce a new black and white image from an existing image, the existing image would typically be either grayscale or color. When converting a grayscale or color image into a black and white image, there are a number of settings that can be adjusted that will impact the resultant black and white image. Another way to produce a new image would be to re-scan the original form for each iteration. Modifying the image either by re-scanning or by converting a grayscale/color image to black and white is a time consuming or CPU-intensive process and can significantly impact the throughput performance of the system. What is needed is a method that can dynamically adjust the baseline values of the response bubble attributes so that the same form image can be processed again for better results without having the added overhead of re-scanning or reconverting an image.

BRIEF SUMMARY OF THE INVENTION

In accordance with preferred embodiments of the present invention, response bubble or form element attributes of a processed response form are compared to baseline response bubble or form element attributes, and based on the comparison, a difference metric value is calculated. If the difference metric value is over a predetermined threshold, the preset values for the baseline response bubble attributes from the form template can be adjusted towards the difference metric value and the processing can be performed again. Optionally, the difference metric value can once again be measured, and if it then falls below the threshold value, the data from the form can be processed. The advantage of this method is that an image needs to be produced only once, and an image typically only needs to be in black and white, which saves on the amount of processing time and computer system overhead needed for the image. Black and white images are significantly smaller in storage size and are faster to produce and process than grayscale or color images.

FIGS. 3a-3e illustrate how preferred embodiments of the present invention work. In this example, the response bubble attribute being illustrated is the density, which is the percentage of dark pixels in the response bubble area. The response bubble fill metric is the actual density of the response bubble being processed, and the fill threshold metric used to determine whether or not the response bubble is considered filled is the baseline average density for unfilled bubbles plus 10%. These settings, along with the unfilled response form image used to make the form template are illustrated in FIG. 3a. The process starts by loading the baseline average density for unfilled bubbles from the form template. Then, using the image of the filled response form being processed, a group of unfilled response bubbles is determined by comparing the densities of all of the response bubbles on the filled response form and finding a group whose densities are significantly lower than others on the form. The actual average density of this group of unfilled response bubbles is taken, and a difference metric value is calculated to determine if the actual average density and baseline average density differ more than the difference metric threshold value. In this case, the difference metric is the absolute value of the difference between the actual average density and the baseline average density. If the difference metric value is greater than the difference metric threshold value, then the baseline average density will be reset to the actual average density. After this, the fill status is determined by calculating the response bubble fill metric value, the actual density of the response bubble being processed, and seeing if it falls above or below the fill threshold.

FIGS. 3b and 3c show an example where a filled response form is scanned with a high brightness setting, causing the image of the response form to be brighter than the unfilled response form image used for the form template. In FIG. 3b, the prior art method is shown when processing the fill status of response bubble "D", which was filled in by the respondent. In the prior art, the baseline average density of unfilled response bubbles, taken from the form template information, is 27.00, and therefore the fill threshold, which is the baseline average density plus 10, is set to 37.00. The actual density measured for response bubble "D" is 33.67, and since this value falls below the fill threshold, the fill status of the response bubble is incorrectly set to unfilled.

FIG. 3c shows a method that addresses the deficiency in the prior art method of FIG. 3b. Similar to the prior art method of FIG. 3b, the baseline average density of unfilled response bubbles, taken from the form template, is 27.00. The software then determines a set of unfilled response bubbles and determines the actual average density of unfilled response bubbles, and this value is determined to be 21.11. A difference metric value is calculated subtracting these two values, and in this case the difference metric value is 5.89, which is above the difference metric threshold value of 5.00. Therefore, the baseline average density is set to the actual average density, or 21.11. Using this adjusted baseline average density, the fill threshold is now set to 31.11. The actual density measured for response bubble "D" is 33.67, and since this value is above the fill threshold, the fill status of the response bubble is now correctly identified as filled.

FIGS. 3d and 3e illustrate the opposite example where a filled response form is scanned in with a low brightness setting, causing the image of the response form to be darker than the image of the unfilled response form used for the form template. In FIG. 3d, the prior art method is shown when processing the fill status of response bubble "B", which was not filled in by the respondent. In the prior art, the baseline average density of unfilled response bubbles, taken from the form template, is 27.00, and therefore the fill threshold, which is the baseline average density plus 10, is set to 37.00. The actual density measured for response bubble "B" is 38.00, and since this value is above the fill threshold, the fill status of the response bubble is incorrectly set to filled.

FIG. 3e shows a method that addresses the deficiency in the prior art method of FIG. 3d. Similar to the prior art method of FIG. 3d, the baseline average density of unfilled response bubbles, taken from the form template, is 27.00. The software then determines a set of unfilled response bubbles and determines the actual average density of unfilled response bubbles, and this value is determined to be 37.00. A difference metric value is calculated subtracting these two values, and in this case the difference metric value is 10.00, which is above the difference metric threshold value of 5.00. Therefore, the baseline average density is set to the actual average density, or 37.00. Using this adjusted baseline average density, the fill threshold is now set to 47.00. The actual density measured for response bubble "B" is 38.00, and since this value is now below the fill threshold, the fill status of the response bubble is now correctly identified as unfilled.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 1 shows a table of image clips of the same set of response bubbles being scanned at different brightness settings and the resulting average calculated densities for the unfilled response bubbles, illustrating the problem to be addressed by the new invention.

FIGS. 3a-3e show different scenarios illustrating how the present invention addresses prior art problems associated with properly identifying response bubble fill status. FIG. 3a shows an image clip of a question from an unfilled response form to create the form template, and the baseline and threshold values determined from that image that are used in FIGS. 3b through 3e. FIG. 3b shows the resulting values of the prior art method of processing response bubble "D" of an image of a response form scanned with a high brightness setting. FIG. 3c shows the resulting values when using a preferred embodiment of the present invention to process response bubble "D" of an image of a response form scanned with a high brightness setting. FIG. 3d shows the resulting values of the prior art method of processing response bubble "B" of an image of a response form scanned with a low brightness setting. FIG. 3e shows the resulting values when using a preferred embodiment of the present invention to process response bubble "B" of an image of a response form scanned with a low brightness setting.

FIG. 4 shows the process of dynamically adjusting response bubble attributes using unfilled response bubbles, in accordance with a preferred embodiment of the present invention.

DETAILED DESCRIPTION OF THE INVENTION

Figure 2:
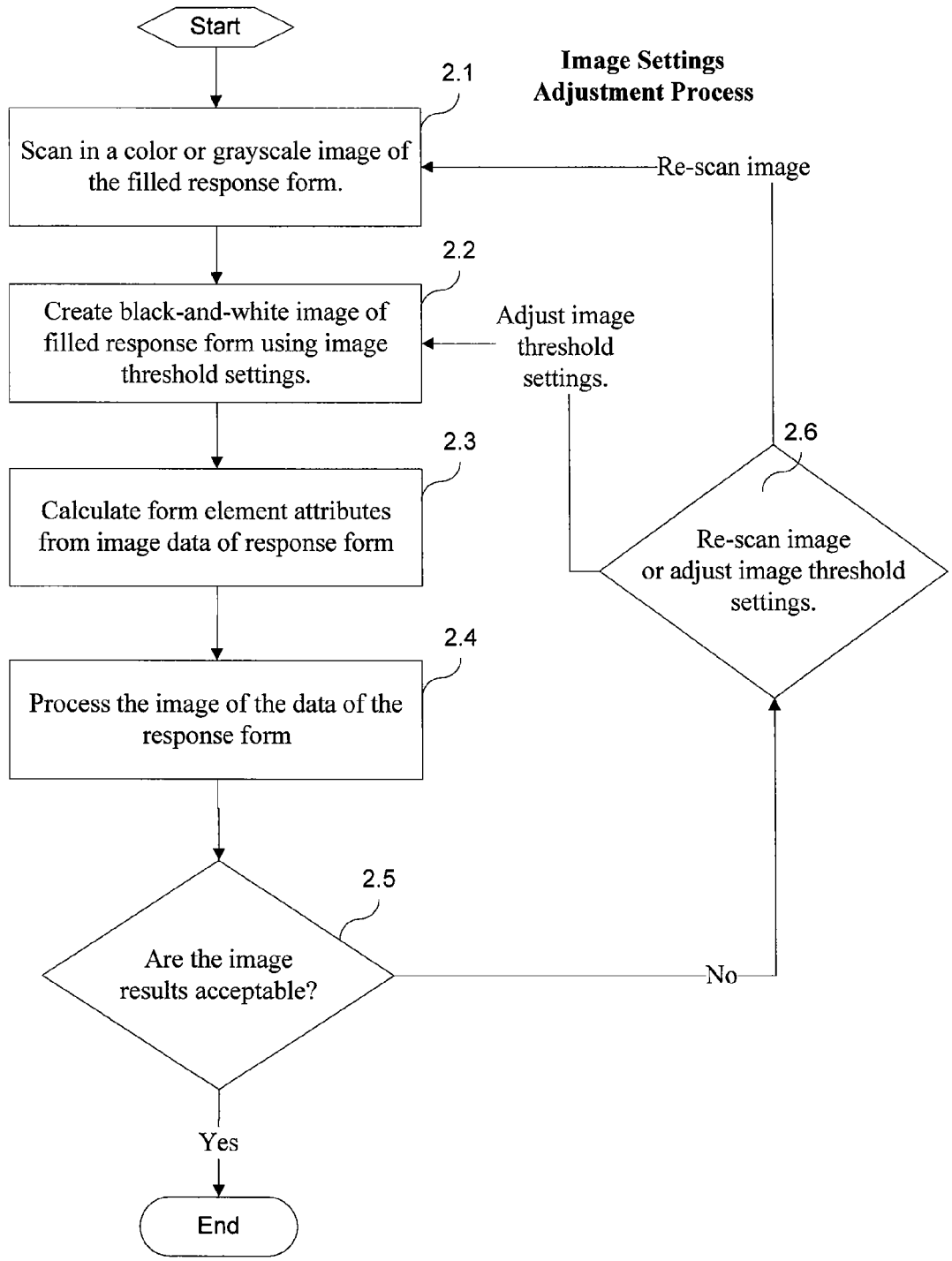
FIG. 2 shows a prior art process of adjusting or re-scanning an image in order to account for differences in forms.

Certain terminology is used herein for convenience only and is not to be taken as a limitation on the present invention.

Definitions response bubble—an enclosed or partially enclosed region on a response form that is intended to be marked or left unmarked.
response bubble fill metric—a metric based on one or more response bubble attributes indicating the degree in which the response bubble is filled.
fill threshold—a value of the response bubble fill metric that corresponds to whether or not a response bubble is considered filled or unfilled.
response form element—a group of pixels on an image pertaining to an item on the response form, such as a graphic, text, response bubble or barcode.
response form element attributes—attributes, such as density, size, location or spacing, that can be measured when processing an image of a form element.
response bubble attributes—form element attributes that apply specifically to response bubbles. Such attributes include density, size, contiguous pels, location or distance from other response bubbles.
baseline response bubble attributes—the response bubble attributes attained from the form template that was typically created from an unfilled response form image.
fill status—a status assigned to a response bubble based on the response bubble fill metric to determine whether the response bubble should be considered filled or unfilled. In a typical embodiment, the determination of whether or not the response bubble fill metric value is "above" or "below" the fill threshold may be a numeric or arithmetic comparison.
unfilled response bubble—a response bubble whose response bubble fill metric value is below the fill threshold.
well-filled response bubble—a response bubble whose response bubble fill metric value unambiguously indicates that its fill status is filled.
expected response bubble results—the anticipated data information of a field from a typical filled response form determined prior to processing the filled response form. In a typical embodiment, this data information may include the expected number of filled response bubbles in the field.
difference metric—a metric derived from other metrics to determine the degree to which two or more metrics are similar. For example, this could be a root-mean-square, correlation, arithmetic average or difference, or some other statistical, parametric, heuristic or mathematical measure.
response form—a form that contains response bubbles to be filled out by a respondent, and optionally other form elements.
unfilled response form—a response form that has not been filled out by a respondent.
filled response form—a response form that has been filled out by a respondent.
form template—information about the form elements and response bubbles, such as location, size, and baseline response bubble density, that is defined in the preferred embodiment by typically using an image of an unfilled response form.

I. OVERVIEW

In each embodiment of the present invention, a filled response form image is compared with the form template created using a response form image.

In one preferred embodiment of the present invention, response bubbles are used to compare the corresponding response bubble attributes to determine if there is a significant difference in the forms. If a significant difference is found, the baseline response bubble attribute values can be altered and the image data can be processed with the new values. Either unfilled or filled bubbles can be used in the response bubble attribute comparison process.

In another preferred embodiment of the present invention, form elements, such as graphics, text and barcodes, are used to compare the corresponding form element attributes to determine if there is a significant difference. If a significant difference is found, the form element attribute values, including the baseline response bubble attribute values, can be altered accordingly and the image data can be processed with the new values.

In an alternative embodiment of the present invention, forms are processed and the results of the form(s) are compared to the expected results of the form. If the results are determined to be significantly different from the expected results, the baseline response bubble attributes can then be changed and the form processed again.

II. DETAILED DISCLOSURE

In order to compare actual response bubble attributes of a filled response form with the baseline response bubble attributes from the form template, a set of response bubbles with known fill statuses must be identified on the filled response form. It is not necessary to know the fill status of every response bubble on the filled response form; only a subset is required. One approach is to measure the response bubble fill metric value of each response bubble on the filled response form and compare the values of the response bubble fill metric of each response bubble to each other. There should be a set of filled response bubbles that have a much higher response bubble fill metric value than those that are unfilled. The filled response bubbles with the highest response bubble fill metric values can be used as a baseline for this comparison, and a group of unfilled response bubbles can be determined by finding response bubbles whose response bubble fill metric values fall below a defined threshold based upon the baseline response bubble fill metric value. These unfilled response bubbles from the filled response form can then be used for response bubble attribute comparison to the baseline response bubble attributes from the form template. If the response bubble fill metric values of all of the response bubbles from the filled response form are too similar to discriminate, then the response bubbles may all be filled or all be unfilled, and the response bubble attribute comparison cannot be reliably done.

There are several different approaches for comparing the unfilled response bubbles from the filled response form to the unfilled response bubbles from the form template. A preferred embodiment is to use the location of the known unfilled response bubbles on the filled response form to determine specifically which response bubbles from the form template they represent. The actual response bubble attributes of the located unfilled response bubbles from the filled response form can then be compared to the corresponding values for each specific response bubble's baseline response bubble attributes from the form template. Differences in these values can then be determined, and a difference metric value for all of the located unfilled response bubbles can be calculated. If the difference metric value is above a defined threshold for a response bubble attribute, the baseline response bubble attribute(s) can be adjusted using the difference metric value and the filled response form can be processed or re-processed with these new baseline response bubble attributes.

An alternative embodiment, illustrated in steps 4.1 through 4.8 of FIG. 4, is to take the average actual response bubble attribute value, like response bubble density, for all of the known unfilled response bubbles of the filled response form, regardless of location. These average response bubble attribute values may then be compared with the average baseline response bubble attributes values of unfilled response bubbles from the form template. Differences in these values can then be determined, and a difference metric value for the unfilled response bubbles can be calculated. If the difference metric value is above a defined threshold for a response bubble attribute, the baseline response bubble attribute can be adjusted using the difference metric value, and the filled response form can be processed or re-processed with these new baseline response bubble attributes. In either case, the response bubble attribute comparison can optionally be repeated with the adjusted baseline values until an acceptable comparison is found. By adjusting the precalculated baseline response bubble attribute values for all of the response bubbles to better match those actual response bubble attribute values of the response bubbles from the filled response form, the comparison between the filled and unfilled response bubbles becomes more valid. This process can be optionally repeated, determining a new difference metric value using the reset baseline response bubble attributes and deciding if further adjustment is needed.

Likewise, there are multiple approaches when doing this comparison with well-filled response bubbles. A preferred embodiment is to use the location of the well-filled response bubbles on the filled response form to determine specifically which response bubbles of the form template the bubbles represent. The actual response bubble attributes of the located well-filled response bubbles can then be compared to the corresponding values for each specific bubble's baseline response bubble attributes from the form template. Differences in these values can then be determined, and a difference metric value for the well-filled response bubbles can be calculated. Similar to the unfilled response bubble method, if the difference metric value is above a user-defined threshold for any response bubble attribute, the baseline response bubble attributes for all response bubbles, including those that are unfilled, can be adjusted using the difference metric value and the form can be processed or re-processed with these new baseline response bubble attributes.

Figure 5:
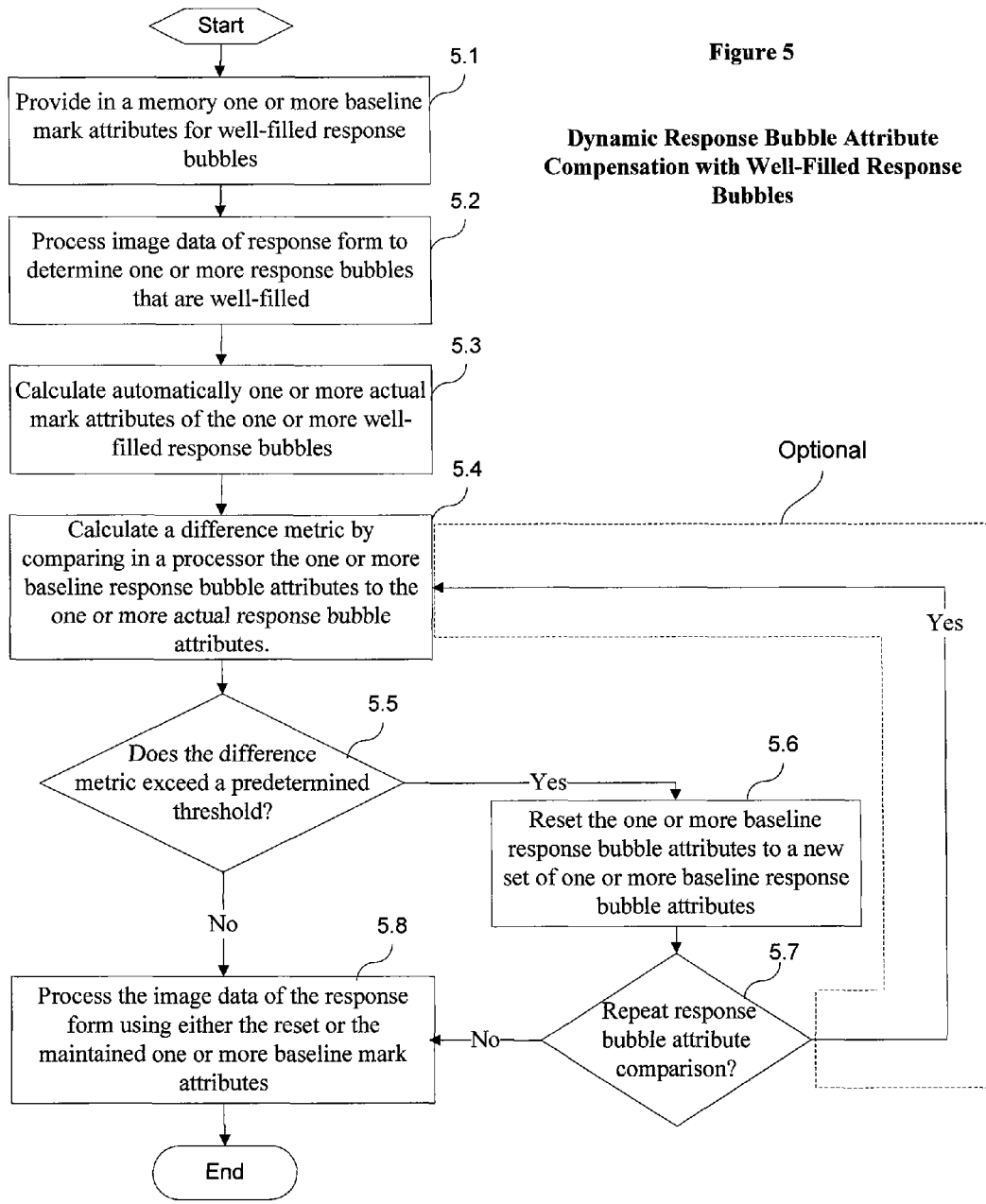
FIG. 5 shows the process of dynamically adjusting response bubble attributes using filled response bubbles, in accordance with a preferred embodiment of the present invention.

An alternative embodiment, illustrated in steps 5.1 through 5.8 of FIG. 5, is to take the average actual response bubble attribute value, like density, for all of the known well-filled response bubbles of the filled response form, regardless of location. These average actual response bubble attribute values may then be compared with the average baseline response bubble attributes values of well-filled response bubbles from the form template. Differences in these values can then be determined, and a difference metric value for the well-filled response bubbles can be calculated. If the difference metric value is above a user-defined threshold for a response bubble attribute, the baseline response bubble attribute can be adjusted using the difference metric value and the filled response form can be processed or re-processed with these new baseline response bubble attributes. In either case, the response bubble attribute comparison can optionally be repeated with the adjusted baseline values until an acceptable comparison is found.

Figure 6:
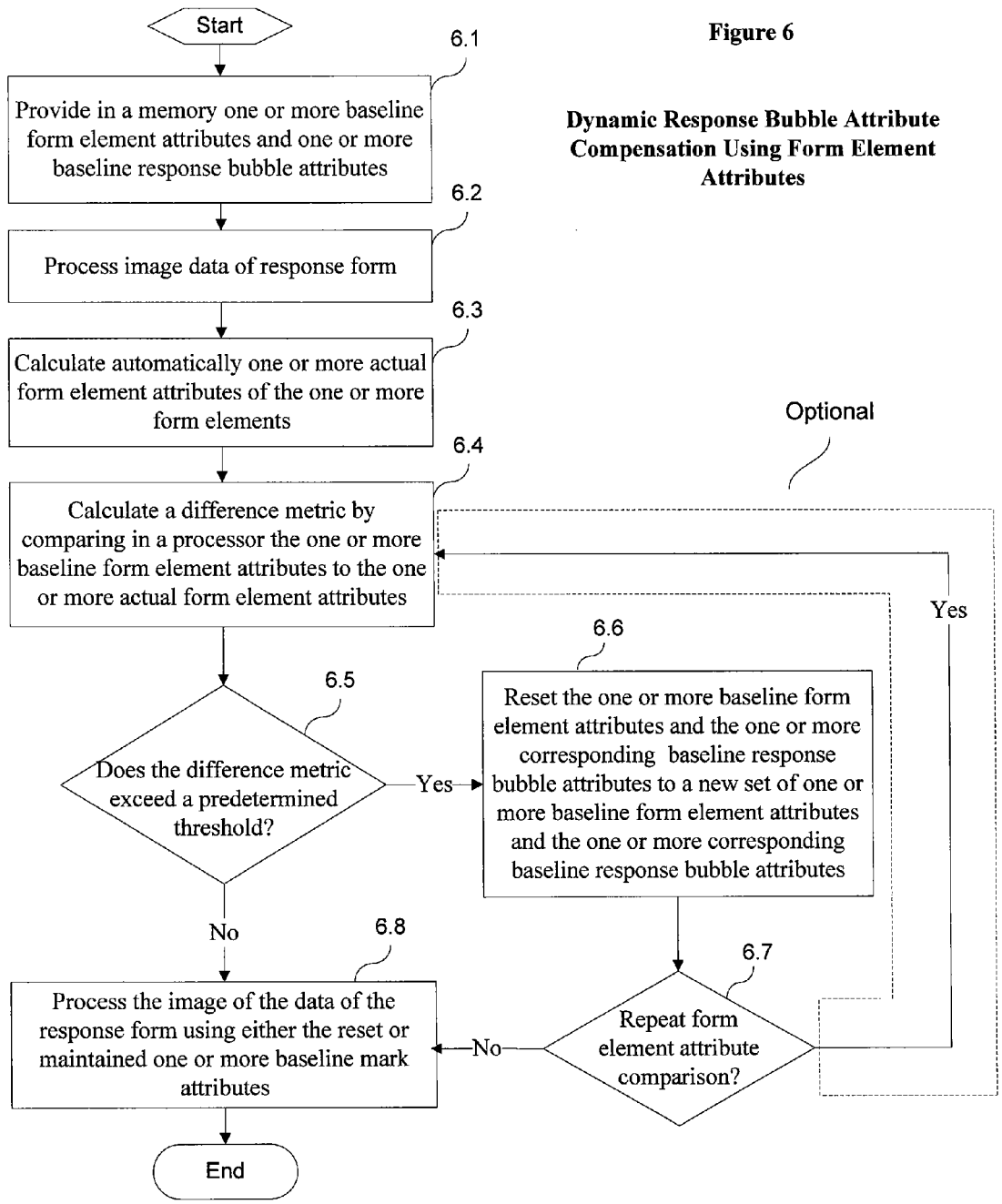
FIG. 6 shows the process of dynamically adjusting response bubble attributes using form element attributes, in accordance with a preferred embodiment of the present invention.

Another method to compensate for response form differences, illustrated in steps 6.1 through 6.8 of FIG. 6, is to compare the attributes of form elements other than response bubbles and then use that comparison to adjust the baseline form element and response bubble attributes for the response bubbles. Response forms can have other elements, such as graphics, text and barcodes. Certain attributes from these form elements can be compared and their differences applied to the baseline form element and response bubble attributes. For example, barcodes are made up of a combination of thin and thick lines. Comparing the width in pixels of the thin and thick lines of the filled response form with the width in pixels of thin and thick lines from the form template may be used to determine if there is a difference in form brightness. If a filled response form is darker than the original response form used to create the form template, the barcode lines will have extra pixels, and therefore the width of these lines will be larger than the barcode lines from the form template. Likewise, a lighter filled response form will have thinner barcode lines. Besides line width, other form element attributes, such as the location, size or density of graphics, text and barcodes, can be used to make similar comparisons. As in the process with response bubble attributes, the baseline form element attributes are loaded from the form template along with the baseline response bubble attributes. Then the actual form element attribute values of the filled response form are compared to the corresponding values for that form element's baseline attribute values from the form template. Differences in these values can then be determined, and a difference metric value for all of the form elements being evaluated can be calculated. If the difference metric value is above a defined threshold for any form element attribute, the baseline form element attributes and corresponding baseline response bubble attributes can be adjusted using the difference metric value, and the form can be processed or re-processed with these new baseline form element attributes. This process can be optionally repeated, determining a new difference metric value using the form element attributes and deciding if further adjustment is needed.

Typically, the filled response forms being processed in a particular batch would be created using the same printer, and the digital image of the form would be produced from the same device, and therefore would often have similar form element attributes. Consequently, caching the adjusted baseline form element attribute values while processing a batch of filled response forms will typically result in better throughput since most subsequent filled response forms in the batch will not require form element attribute compensation. If the form element attributes of the filled response forms being processed are significantly different than the form element attributes of the response form used to create the form template, then typically the baseline form element attributes will only need to be adjusted for the first filled response form since the subsequent forms will usually have similar form element attribute values. If, however, subsequent filled response forms go through the form element attribute comparison using the adjusted baseline form element attributes from the cache and a form element attribute comparison exceeds the threshold, then the process can be repeated and the new adjusted form element attribute values can be cached.

In steps 4.8, 5.8 and 6.8 of respective FIGS. 4-6, the "maintained one or more baselines" are either the original baseline mark attributes, or the last reset baseline mark attributes of the optional feedback loop.

Figure 7:
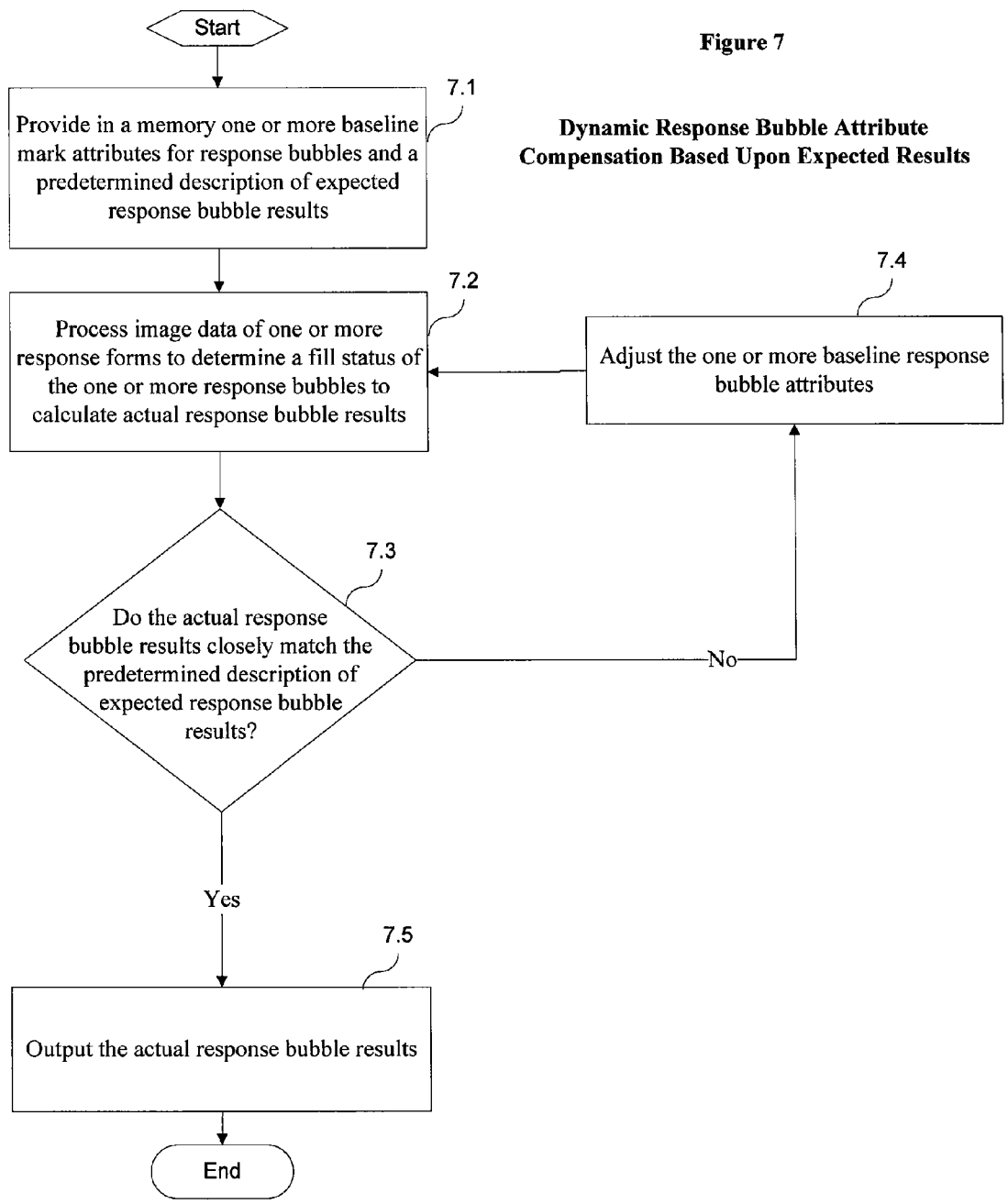
FIG. 7 shows the process of adjusting response bubble attributes based upon comparing the results with the expected results, in accordance with a preferred embodiment of the present invention.

Another alternative embodiment to the entire process, illustrated in steps 7.1 through 7.5 of FIG. 7, is to analyze the actual results of the processed filled response form and compare them to the expected results. Response bubbles are often grouped together in a corresponding field, where each response bubble pertains to one option from that field. Oftentimes, the number of responses that is expected in an average response form for the field is known when setting up the response form template. For example, most fields typically look for only one response, although others can also be set up to expect zero responses or more than one response. Therefore, if a filled response form being processed has a number of fields with more than or less than the number of expected responses, it could be caused by a difference in response bubble attributes. Therefore, in this process, the baseline response bubble attributes would be read in from the form template. The fill status for the response bubbles of the filled response form is determined by comparing the density of the response bubbles with the baseline density from the form template. The fill statuses for the response bubbles are then used to calculate the actual results, including the number of responses per field. The actual results can then be compared to the expected results to determine if they closely match. For example, the number of responses per field can then be compared with the expected number of responses for each corresponding field. If the number of responses for the field of the filled response form differs from the number of expected responses for the field from the form template, then a difference metric value can be calculated for this difference. If the difference metric value is above a defined threshold value, then the actual results of the filled response form do not closely match the expected results from the form template, and the baseline response bubble attributes can be adjusted using the difference metric value. The filled response form then can be processed or re-processed with the adjusted baseline response bubble attributes, and this process can be repeated.

Figure 8:
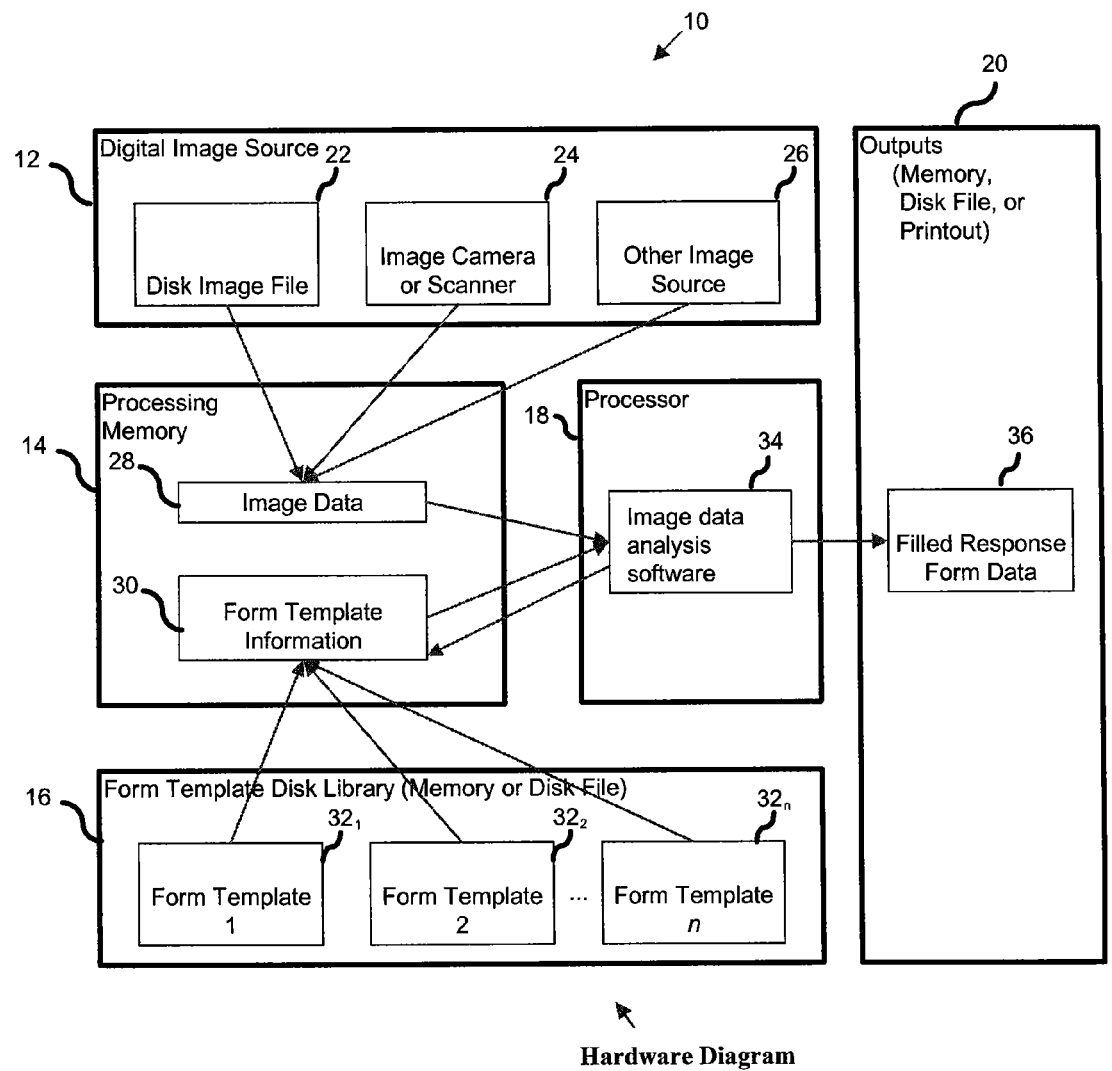
FIG. 8 shows a hardware schematic diagram in accordance with a preferred embodiment of the present invention.

FIG. 8 shows a hardware configuration 10 for this process. Digital image source 12 typically comes from one of several different possible sources, including a disk image file 22, an image scanner or camera 24, or other image sources 26. The image source 12 information is then sent into processing memory 14, wherein image data 28 is determined using the image source information. At the same time, information from form templates $32_1$ through $32_n$ in form template disk library 16 is sent into form template information 30 in processing memory 14, where the response bubble and form element attribute information, the predetermined thresholds and the expected results are stored. The image data 28 and the form template information 30 are then passed into processor 18 where image data analysis software 34 determines the fill status of the response bubbles and also the difference metric value of the response bubble and form element attributes. If the difference metric value is above the difference metric threshold value, then the baseline response bubble and form element attributes are adjusted and sent back to the processing memory 14 before being reloaded into the processor and having the image data results processed again. When the difference metric value falls below the difference metric threshold value, then the results are sent to filled response form data 36 in outputs 20, which can include memory, disk files or a printout.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer readable media. The media is encoded with computer readable program code for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. An automated method of processing image data of a response form that has a plurality of response bubbles, including at least one filled and at least one unfilled response bubble, the method comprising:
   (a) providing in a memory one or more baseline response bubble attributes for unfilled response bubbles;
   (b) processing image data of a response form to determine one or more response bubbles that are unfilled;
   (c) automatically calculating in a processor one or more actual response bubble attributes of the one or more unfilled response bubbles;

(d) calculating a difference metric value by comparing in a processor the one or more baseline response bubble attributes to the one or more actual response bubble attributes;

(e) resetting the one or more baseline response bubble attributes to a new set of one or more baseline response bubble attributes if the difference metric value exceeds a predetermined threshold, and maintaining the one or more baseline response bubble attributes if the difference metric value does not exceed the predetermined threshold; and (f) processing the image data of the response form in the processor using either the reset or maintained one or more baseline response bubble attributes as determined in step (e) to determine the filled and unfilled response bubbles of the response form.

2. The method of claim 1 wherein the new set of one or more baseline response bubble attributes is the one or more actual response bubble attributes.

3. The method of claim 1 wherein at least one of the baseline response bubble attributes is a baseline response bubble density.

4. The method of claim 1 wherein at least one of the baseline response bubble attributes is a baseline response bubble size.

5. The method of claim 1 wherein step (b) further comprises processing image data of a response form by using the one or more baseline response bubble attributes to determine one or more response bubbles that are unfilled.

6. The method of claim 1 wherein the image data is a black and white image of the response form.

7. The method of claim 1 wherein the memory further includes location information of one or more unfilled response bubbles, and step (b) further comprises using the location information of the at least one unfilled response bubble to determine the one or more response bubbles that are unfilled.

8. The method of claim 1 wherein steps (d) and (e) are repeated until the calculated difference metric value does not exceed the predetermined threshold.

9. An automated method of processing image data of a response form that has a plurality of response bubbles, including at least one well-filled and at least one unfilled response bubble, the method comprising:

(a) providing in a memory one or more baseline response bubble attributes for well-filled response bubbles;

(b) processing image data of a response form to determine one or more response bubbles that are well-filled;

(c) automatically calculating in a processor one or more actual response bubble attributes of the one or more well-filled response bubbles;

(d) calculating a difference metric value by comparing in a processor the one or more baseline response bubble attributes to the one or more actual response bubble attributes;

(e) resetting the one or more baseline response bubble attributes to a new set of one or more baseline response bubble attributes if the difference metric value exceeds a predetermined threshold, and maintaining the one or more baseline response bubble attributes if the difference metric value does not exceed the predetermined threshold; and (f) processing the image data of the response form in the processor using either the reset or maintained one or more baseline response bubble attributes as determined in step (e) to determine the filled and unfilled response bubbles of the response form.

10. The method of claim 9 wherein the new set of one or more baseline response bubble attributes is the one or more actual response bubble attributes.

11. The method of claim 9 wherein at least one of the baseline response bubble attributes is a baseline response bubble density.

12. The method of claim 9 wherein at least one of the baseline response bubble attributes is a baseline response bubble size.

13. The method of claim 9 wherein step (b) further comprises processing image data of a response form by using at least the one or more baseline response bubble attributes to determine one or more response bubbles that are well-filled.

14. The method of claim 9 wherein the image data is a black and white image of the response form.

15. The method of claim 9 wherein the memory further includes location information of one or more well-filled response bubbles, and step (b) further comprises using the location information of the at least one well-filled response bubble to determine the one or more response bubbles that are well-filled.

16. The method of claim 9 wherein steps (d) and (e) are repeated until the calculated difference metric value does not exceed the predetermined threshold.

17. An automated method of processing image data of one or more response forms, the response form having one or more response bubbles, the method comprising:

(a) providing in a memory:
  (i) one or more initial baseline response bubble attributes for response bubbles, and
  (ii) a predetermined description of expected response bubble results;

(b) processing the image data of the one or more response forms to determine a fill status of the one or more response bubbles of the one or more response forms to calculate actual response bubble results;

(c) adjusting the one or more baseline response bubble attributes if the actual response bubble results does not closely match the predetermined description of expected response bubble results, and outputting actual response bubble results if the actual response bubble results closely match the predetermined description of expected response bubble results; and (d) repeating steps (b) and (c) up to a predetermined number of times using the adjusted one or more response bubble attributes only if the actual response bubble results do not closely match the predetermined description of expected response bubble results.

18. The method of claim 17 wherein step (b) further comprises processing image data of the one or more response forms by using at least the one or more baseline response bubble attributes to determine a fill status of the one or more response bubbles of the one or more response forms.

19. The method of claim 17 wherein at least one of the baseline response bubble attributes is a baseline response bubble density.

20. The method of claim 17 wherein the one more initial baseline response bubble attributes for response bubbles is one or more response bubble attributes for well-filled response bubbles.

21. The method of claim 17 wherein the one more initial baseline response bubble attributes for response bubbles is one or more response bubble attributes for unfilled response bubbles.

22. The method of claim 17 wherein the image data is a black and white image of the one or more response forms.

23. An automated method of processing image data of a response form, the response form having one or more response bubbles, the response form including one or more form elements, the method comprising:
  (a) providing in a memory
    (i) one or more baseline form element attributes, and
    (ii) one or more corresponding baseline response bubble attributes;
  (b) automatically calculating in a processor one or more actual form element attributes of the one or more form elements;
  (c) calculating a difference metric value by comparing in a processor the one or more baseline form element attributes to the one or more actual form element attributes;
  (d) resetting the one or more baseline form element attributes and the one or more corresponding baseline response bubble attributes to a new set of one or more baseline form element attributes and the one or more corresponding baseline response bubble attributes if the difference metric value exceeds a predetermined threshold, and maintaining the one or more baseline form element attributes and the one or more corresponding baseline response bubble attributes if the difference metric value does not exceed the predetermined threshold; and
  (e) processing the image data of the response form in the processor using either the reset or maintained one or more baseline response bubble attributes as determined in step (d) to determine the filled and unfilled response bubbles of the response form.

24. The method of claim 23 wherein at least one of the form elements is a graphical object.

25. The method of claim 23 wherein at least one of the form elements is a bar code, and one of the form element attributes is thickness of bar code lines.

26. The method of claim 23 wherein the image data is a black and white image of the response form.

27. The method of claim 23 wherein steps (c) and (d) are repeated until the calculated difference metric value does not exceed the predetermined threshold.

* * * * *